United States Patent [19]
Yanagihara et al.

[11] Patent Number: 5,826,427
[45] Date of Patent: Oct. 27, 1998

[54] COMPRESSION IGNITION TYPE ENGINE

[75] Inventors: Hiromichi Yanagihara, Gotenba; Kiyoshi Kobashi, Mishima, both of Japan

[73] Assignee: Toyota Jidosha Kabushiki Kaisha, Toyota, Japan

[21] Appl. No.: 715,399

[22] Filed: Sep. 18, 1996

[30] Foreign Application Priority Data

Sep. 20, 1995 [JP] Japan .................................. 7-241769

[51] Int. Cl.$^6$ .................................................. F01N 3/20
[52] U.S. Cl. .............................. 60/276; 60/278; 60/297; 60/301; 123/569
[58] Field of Search .......................... 60/274, 276, 278, 60/285, 297, 301, 311; 123/569, 1 A

[56] References Cited

U.S. PATENT DOCUMENTS

| | | | |
|---|---|---|---|
| 4,664,086 | 5/1987 | Takeda et al. | 123/674 |
| 4,727,848 | 3/1988 | Stumpp et al. | 123/569 |
| 4,958,598 | 9/1990 | Fosseen | 123/1 A |
| 5,333,591 | 8/1994 | Korsmeier et al. | 123/527 |
| 5,457,958 | 10/1995 | Boegner et al. | 60/279 |
| 5,473,887 | 12/1995 | Takeshima et al. | 60/276 |
| 5,711,149 | 1/1998 | Araki | 60/278 |

FOREIGN PATENT DOCUMENTS

| | | |
|---|---|---|
| A-27689 | 4/1981 | European Pat. Off. . |
| 53-076968 A | 7/1978 | Japan . |
| A-56-2433 | 1/1981 | Japan . |
| B-60-17938 | 5/1985 | Japan . |
| A-62-56743 | 4/1987 | Japan . |
| A-64-3017 | 1/1989 | Japan . |
| A-3-234793 | 10/1991 | Japan . |
| A-5-140568 | 6/1993 | Japan . |
| A-5-202373 | 8/1993 | Japan . |
| 6-317142 A | 11/1994 | Japan . |
| 7-047227 A | 2/1995 | Japan . |
| 7-279649 A | 10/1995 | Japan . |
| A-2000222 | 1/1979 | United Kingdom . |
| WO-95/27128 | 10/1995 | WIPO . |

OTHER PUBLICATIONS

"Effects of Oxygenated Fuel on Exhaust Emission from DI Diesel Engines", Kuramata et al., No. 950, 1995, pp. 8–11.
Abstract of JP–62–007943–A, Jan. 1987.
Abstract of JP–63–061765–A, Mar. 1988.
Abstract of JP–06–033839–A, Feb. 1994.

*Primary Examiner*—Tony M. Argenbright
*Attorney, Agent, or Firm*—Oliff & Berridge, PLC

[57] ABSTRACT

A compression ignition type engine comprising an $NO_x$ arranged in its exhaust passage. This $NO_x$ absorbent absorbs $NO_x$ when the air-fuel ratio of the inflowing exhaust gas is lean and releases the absorbed $NO_x$ when the air-fuel ratio of the exhaust gas is rich. When $NO_x$ should be released from the $NO_x$ absorbent, the mean value of the air-fuel ratio in the combustion chamber is changed from lean to rich. At least at this time, use is made of fuel containing oxygen as the injected fuel.

14 Claims, 12 Drawing Sheets

COMPRESSION IGNITION TYPE ENGINE

BACKGROUND OF THE INVENTION

1. Field of the Invention

The present invention relates to a compression ignition type engine.

2. Description of the Related Art

Known in the art is a compression ignition type engine which provides in the engine exhaust passage an $NO_x$ absorbent which absorbs $NO_x$ when the air-fuel ratio of the inflowing exhaust gas flowing into the $NO_x$ absorbent is lean and releases the absorbed $NO_x$ when the air-fuel ratio of the inflowing exhaust gas is the stoichiometric air-fuel ratio or rich. The mean value of the air-fuel ratio in the combustion chamber is normally maintained lean, and the $NO_x$ produced in the combustion chamber is absorbed in the $NO_x$ absorbent. The mean value of the air-fuel ratio in the combustion chamber is changed from lean to rich when the $NO_x$ is to be released from the $NO_x$ absorbent (see International Publication WO93/07363).

When changing the mean value of the air-fuel ratio in the combustion chamber in such a compression ignition type engine from lean to rich, however, the fuel spray becomes extremely rich and a large amount of soot is produced, so there is the problem that it in fact becomes impossible to make the mean value of the air-fuel ratio in the combustion chamber rich.

SUMMARY OF THE INVENTION

An object of the present invention is to provide a compression ignition type engine capable of making the mean value of the air-fuel ratio in the combustion chamber a rich air-fuel ratio or the stoichiometric air-fuel ratio to release $NO_x$ from the $NO_x$ absorbent while preventing the generation of soot.

According to the present invention, there is provided a compression ignition type engine having an exhaust passage, comprising an $NO_x$ absorbent arranged in the exhaust passage, the $NO_x$ absorbent absorbing $NO_x$ when an air-fuel ratio of exhaust gas flowing into the $NO_x$ absorbent is lean and releasing the absorbed $NO_x$ when the air-fuel ratio of exhaust gas is one of a rich air-fuel ratio and the stoichiometric air-fuel ratio, and air-fuel ratio control means for normally maintaining the mean value of the air-fuel ratio in a combustion chamber of the engine at a lean air-fuel ratio and changing over the mean value of the air-fuel ratio from a lean air-fuel ratio to one of a rich air-fuel ratio and the stoichiometric air-fuel ratio when $NO_x$ should be released from the $NO_x$ absorbent, a fuel containing oxygen therein being used at least when the mean value of the air-fuel ratio is made one of a rich air-fuel ratio and the stoichiometric air-fuel ratio.

BRIEF DESCRIPTION OF THE DRAWINGS

The present invention may be more fully understood from the description of the preferred embodiments of the invention set forth below together with the accompanying drawings, wherein.

DESCRIPTION OF THE PREFERRED EMBODIMENTS

Figure 1:
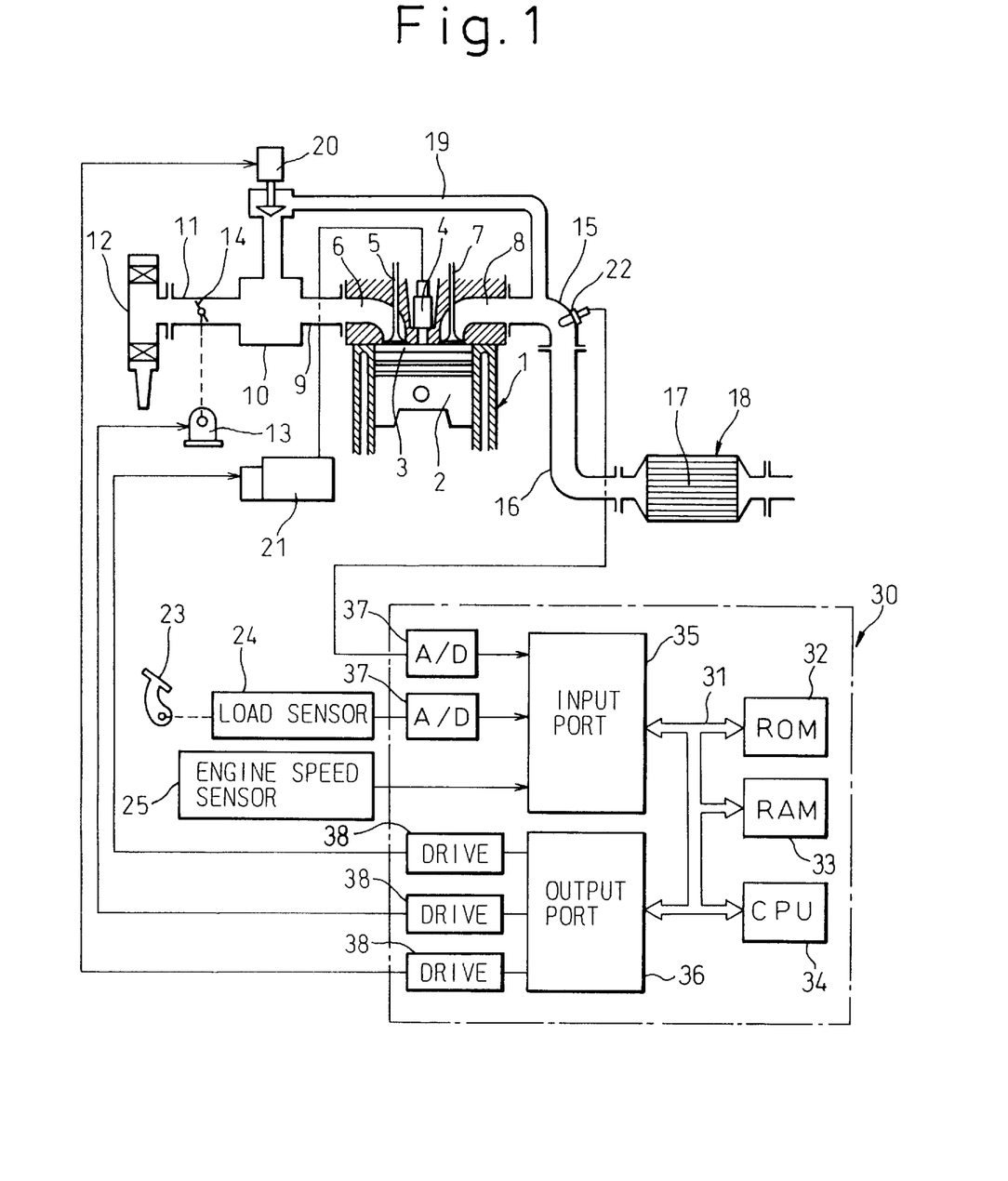
FIG. 1 is an overview of a compression ignition type engine.

Referring to FIG. 1, 1 is the body of an in-cylinder injection type compression ignition type engine, 2 is a piston, 3 is a combustion chamber, 4 is a fuel injector for directly injecting fuel toward the inside of the combustion chamber 3, 5 is an intake valve, 6 is an intake port, 7 is an exhaust valve, and 8 is an exhaust port. The intake port 6 is connected through a corresponding intake pipe 9 to a surge tank 10, while the surge tank 10 is connected through an intake duct 11 to an air cleaner 12. Inside the intake duct 11 is arranged a throttle valve 14 which is controlled to open and close by a drive motor 13. On the other hand, the exhaust port 8 is connected through an exhaust manifold 15 and exhaust pipe 16 to a casing 18 housing an $NO_x$ absorbent 17.

The exhaust manifold 15 and the surge tank 10 are connected with each other by an exhaust gas recirculation (EGR) passage 19. In the EGR passage 19 is disposed an EGR control valve 20 for controlling the amount of EGR gas which is recirculated from the exhaust manifold 15 to the surge tank 10. On the other hand, the fuel injector 4 is connected to a fuel injection pump 21 driven by the engine. Fuel discharged from the fuel injection pump 21 is supplied to the fuel injector 4. This fuel injection pump 21 is controlled in its discharge by an output signal of an electronic control unit 30 and therefore the amount of fuel injected from the fuel injector 4 is also controlled by the output signal of the electronic control unit 30.

The electronic control unit 30 is comprised of a digital computer which is provided with a read only memory (ROM) 32, random access memory (RAM) 33, microprocessor (CPU) 34, input port 35, and output port 36 all connected with each other by a bidirectional bus 31. In the exhaust manifold 15 is disposed an air-fuel ratio sensor 22 for detecting the mean value of the air-fuel ratio in the combustion chamber 3. The output signal of the air-fuel ratio sensor 22 is input through the corresponding AD converter 37 to the input port 35. Further, the accelerator pedal 23 is connected to a load sensor 24 which generates an output voltage proportional to the amount of depression of the accelerator pedal 23. The output voltage of the load sensor 24 is input through the corresponding AD converter 37 to the input port 35. Further, the inport port 35 has connected to it an engine speed sensor 25 which generates an output pulse expressing the engine speed. On the other hand, the output port 36 is connected through a corresponding drive circuit 38 to a drive motor 13, the EGR control valve 20, and the fuel injection pump 21.

A compression ignition type engine generally is operated in a state of a considerably large rate of excess air, that is, in a state with a considerably lean mean value of the air-fuel ratio in the combustion chamber. So long as the mean value of the air-fuel ratio in the combustion chamber is considerably lean in this way, however, a sufficiently high engine output cannot be obtained. To raise the engine output, it is necessary to bring the mean value of the air-fuel ratio in the combustion chamber as close to the stoichiometric air-fuel ratio as possible. When bringing the mean value of the air-fuel ratio in the combustion chamber close to the stoichiometric air-fuel ratio in a compression ignition type engine which injects fuel directly into the combustion chamber, however, the fuel spray becomes extremely rich and a large amount of soot ends up being produced. Accordingly, in the past, it was not possible to bring the air-fuel ratio in the combustion chamber close to the stoichiometric air-fuel ratio in a compression ignition type engine and the engine had to be operated in the state of a considerably lean air-fuel ratio in the combustion chamber.

Note that when injecting fuel into the intake passage, the fuel spray disperses homogeneously inside the combustion chamber, so even if the mean value of the air-fuel ratio in the combustion chamber is made the stoichiometric air-fuel ratio, no soot will be produced, but in this case an explosive combustion is caused, so this method cannot be adopted.

Therefore, in the present invention, use is made of fuel containing oxygen as the fuel injected from the fuel injector 4 to the combustion chamber 3 so as to give a good combustion without the production of soot even if making the mean value of the air-fuel ratio in the combustion chamber close to the stoichiometric air-fuel ratio. In this case, as the fuel containing oxygen, use may be made of a fuel containing oxygen atoms in the hydrocarbon molecules themselves or fuel obtainined by adding an additive containing oxygen. Whichever fuel is used, oxygen ends up being contained in the fuel injected from the fuel injector 4.

Figure 2A:
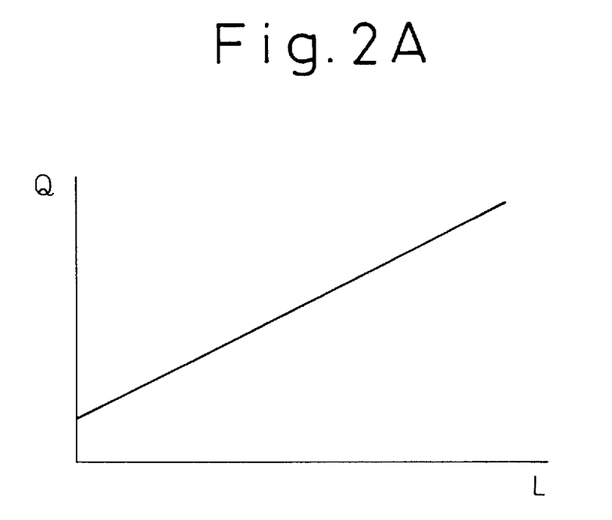
FIGS. 2A and 2B are views of the fuel injection amount Q.

FIG. 2A shows the relationship between the injection amount Q of the fuel containing oxygen and the amount of depression L of the accelerator pedal 23 at the time of a constant engine speed. As shown in FIG. 2A, the fuel injection amount Q increases the greater the amount of depression L of the accelerator pedal 23, that is, the higher the engine load. Note that in actuality, the fuel injection amount Q is also a function of the engine speed N, not just the amount of depression L of the accelerator pedal 23. Therefore, the fuel injection amount Q is stored in the ROM 32 in advance in the form of the map shown in FIG. 2B.

Figure 3:
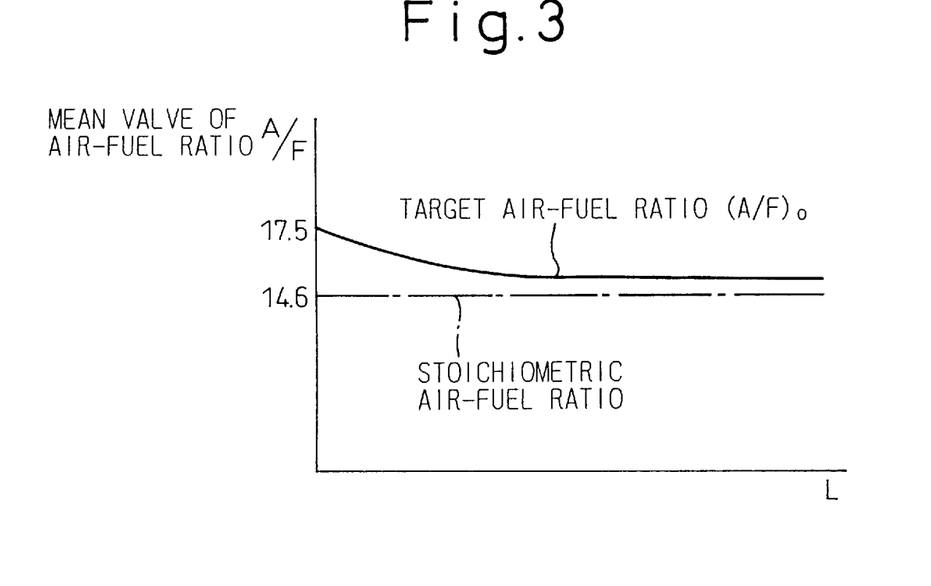
FIG. 3 is a view of the target air-fuel ratio $(A/F)_0$.

FIG. 3 shows the relationship between the amount of depression L of the accelerator pedal 23 and the target value of the mean value of the air-fuel ratio in the combustion chamber 3, that is, the target air-fuel ratio $(A/F)_0$. This target air-fuel ratio $(A/F)_0$ shows the lower limit of the air-fuel ratio which does not produce much soot. It may be seen that this target air-fuel ratio $(A/F)_0$ is somewhat to the lean side when the engine load is low, but becomes considerably close to the stoichiometric air-fuel ratio when the engine load rises to a certain degree.

Figure 4:
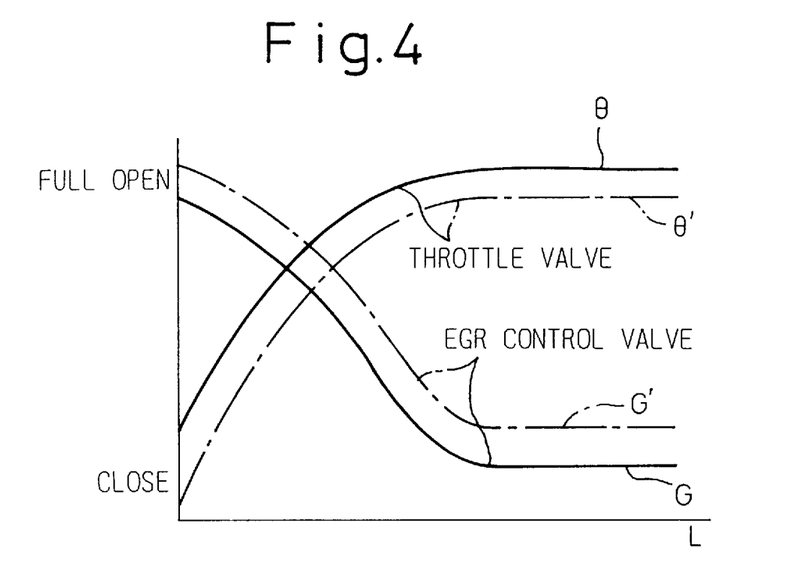
FIG. 4 is a graph of the opening of an EGR control valve and throttle valve.

On the other hand, to maintain the mean value of the air-fuel ratio in the combustion chamber 3 at the target air-fuel ratio $(A/F)_0$ shown in FIG. 3, one method is to increase the amount of EGR gas recirculated the lower the engine load so as to reduce the amount of intake air supplied into the combustion chamber 3, while another method is to reduce the opening of the throttle valve 14 the lower the engine load so as to decrease the amount of intake air supplied in the combustion chamber 3. Another method is to perform these operations simultaneously. The solid lines in FIG. 4 show the case of simultaneous use of these methods. In this case, as shown by the solid lines in FIG. 4, the smaller the amount of depression L of the accelerator pedal 23, the more the EGR control valve 20 is opened, that is, the greater the amount of EGR gas and, at the same time, the smaller the opening of the throttle valve 14. Note that in actuality the opening of the EGR control valve 20 and the opening of the throttle valve 14 are functions of not only the amount of depression L of the accelerator pedal 23, but also the engine speed N. Accordingly, the opening G of the EGR control valve 14 and the opening $\theta$ of the throttle valve 14 are stored in advance in the ROM 32 in the form of the maps shown in FIG. 5A and FIG. 5B, respectively.

Figure 5A:
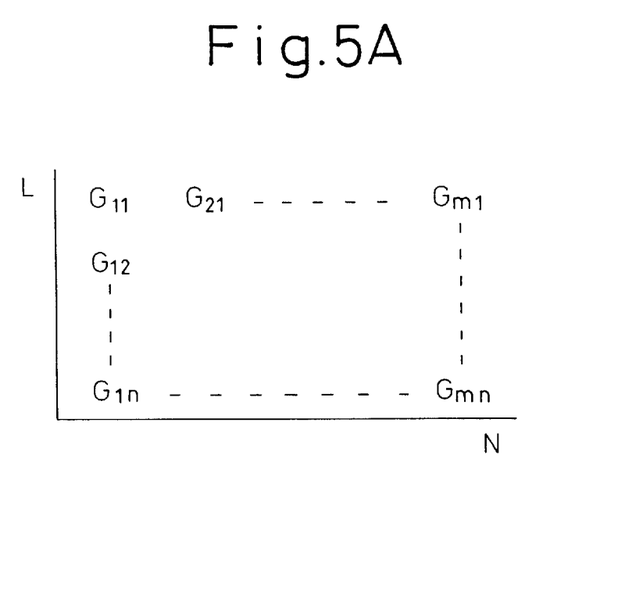
FIGS. 5A and 5B are views of maps of the opening G of the EGR control valve and the opening θ of the throttle valve.
Figure 5B:
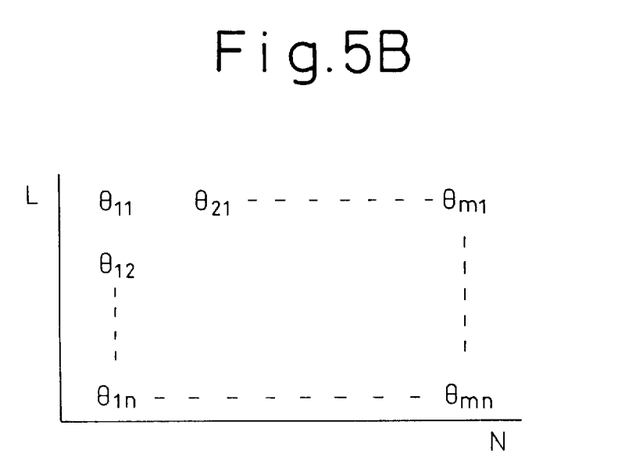

Accordingly, when using the value shown in FIG. 2A as the fuel injection amount Q, using the value shown in FIG. 5A as the opening G of the EGR control valve 20, and using the value shown in FIG. 5B as the opening $\theta$ of the throttle valve 14 based on the amount of depression L of the accelerator pedal 23 and the engine speed N, the mean value of the air-fuel ratio in the combustion chamber 3 becomes the target air-fuel ratio $(A/F)_0$ shown in FIG. 3. In this case, if no oxygen were contained in the fuel, the air-fuel ratio in the spray region of the fuel injected from the fuel injector 4 would become extremely rich and therefore a large amount of soot would be produced. However, in the present invention, since the fuel contains oxygen, oxygen is homogeneously dispersed in the fuel spray and therefore the fuel particles are burned in the presence of sufficient oxygen and it is possible to obtain good combustion without production of is soot. Note that the opening G of the EGR control valve 20 shown in FIG. 5A and the opening $\theta$ of the throttle valve 14 shown in FIG. 5B are of course set in consideration of the amount of oxygen contained in the fuel so that the air-fuel ratio in the combustion chamber 3 becomes the target air-fuel ratio $(A/F)_0$.

In this way, according to the present invention, it is possible to bring the mean value of the air-fuel ratio A/F in the combustion chamber 3 considerably close to the stoichiometric air-fuel ratio, so it becomes possible to obtain a high engine output.

However, when the content of the oxygen in the fuel and the pretargeted content differ, if the Q, G, and $\theta$ were determined from the maps shown in FIGS. 5A and 5B, then the mean value of the air-fuel ratio A/F in the combustion chamber 3 would end up deviating from the target air-fuel ratio $(A/F)_0$. Therefore, in this embodiment of the present invention, feedback control is performed on the fuel injection amount Q or the amount of EGR gas based on the output signal of the air-fuel ratio sensor 22 so that the mean value of the air-fuel ratio A/F in the combustion chamber 3 becomes the target air-fuel ratio $(A/F)_0$.

Figure 6:
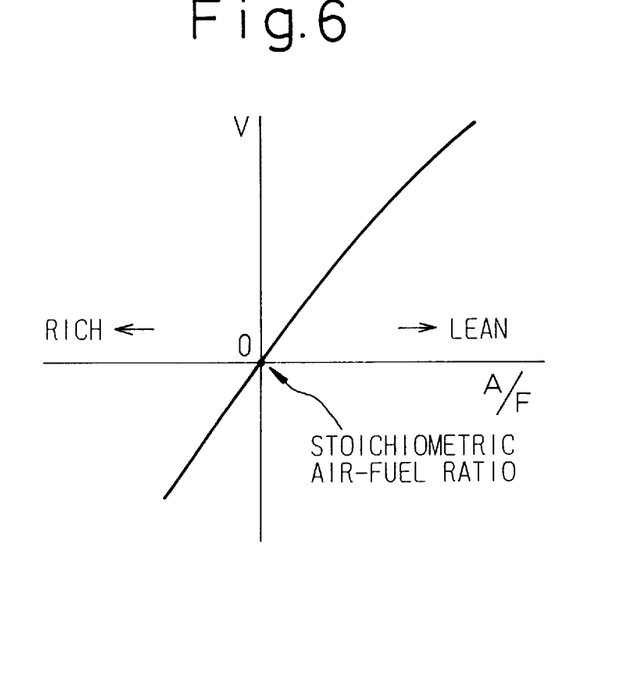
FIG. 6 is a graph of the output of an air-fuel ratio sensor.

Next, a brief explanation will be made of the feedback control. FIG. 6 shows the relationship between the output voltage V of the air-fuel ratio sensor 22 and the mean value of the air-fuel ratio A/F in the combustion chamber 3. Accordingly, it is seen that it is possible to detect the mean value of the air-fuel ratio A/F in the combustion chamber 3 by the air-fuel ratio sensor 22. When controlling the mean value of the air-fuel ratio A/F by the fuel injection amount Q, when the mean value of the air-fuel ratio A/F detected by the air-fuel ratio sensor 22 is larger than the target air-fuel ratio $(A/F)_0$, the fuel injection amount Q is increased, while when the mean value of the air-fuel ratio A/F detected by the air-fuel ratio sensor 22 is smaller than the target air-fuel ratio $(A/F)_0$, the fuel injection amount Q is reduced. On the other hand, when controlling the mean value of the air-fuel ratio A/F by the amount of EGR gas, when the mean value of the air-fuel ratio A/F detected by the air-fuel ratio sensor 22 is larger than the target air-fuel ratio $(A/F)_0$, the amount of the EGR gas is increased, while when the mean value of the air-fuel ratio A/F detected by the air-fuel ratio sensor 22 is smaller than the target air-fuel ratio $(A/F)_0$, the amount of the EGR gas is reduced.

In this way, in the present invention, the mean value of the air-fuel ratio A/F in the combustion chamber 3 is maintained at the target air-fuel ratio $(A/F)_0$ and during this time the $NO_x$ contained in the exhaust gas exhausted from the combustion chamber 3 to the exhaust manifold 15 is absorbed in the $NO_x$ absorbent 17. Therefore, next, an explanation will be made of the $NO_x$ absorbent 17.

The $NO_x$ absorbent 17 contained in the casing 18 uses for example alumina as a carrier. On this carrier is carried, for example, at least one element selected from the group of potassium K, sodium Na, lithium Li, cesium Cs, and other alkali metals, barium Ba, calcium Ca, and other alkali earths, and lanthanum La, yttrium Y, and other rare earths and a precious metal such as platinum Pt. Referring to the ratio of the air and the fuel supplied in the engine intake passage, combustion chamber 3, and exhaust passage upstream of the $NO_x$ absorbent 17 as the air-fuel ratio of the inflowing exhaust gas flowing into the $NO_x$ absorbent 17, the $NO_x$ absorbent 17 performs an $NO_x$ absorption and release action wherein it absorbs $NO_x$ when the air-fuel ratio of the inflowing exhaust gas is lean and releases the absorbed $NO_x$ when the concentration of oxygen in the inflowing exhaust gas falls. Note that when fuel or air is not supplied into the exhaust passage upstream of the $NO_x$ absorbent 17, the air-fuel ratio of the inflowing exhaust gas matches with the mean value of the air-fuel ratio A/F in the combustion chamber 3 and therefore in this case the $NO_x$ absorbent 17 absorbs $NO_x$ when the mean value of the air-fuel ratio A/F in the combustion chamber 3 is lean and releases the absorbed $NO_x$ when the concentration of oxygen in the combustion chamber 3 falls.

The above-mentioned $NO_x$ absorbent 17 performs the actual action of absorbing and releasing $NO_x$ by just being placed in the engine exhaust passage, but parts of the detailed mechanism behind this absorption and release action are not clear. However, the absorption and release action is believed to be due to the mechanism shown in FIGS. 7A and 7B. This mechanism will be explained next taking as an example the case of carrying platinum Pt and barium Ba on the carrier, but a similar mechanism operates even if use is made of another precious metal, alkali metal, alkali earth, and rare earth.

Figure 7A:
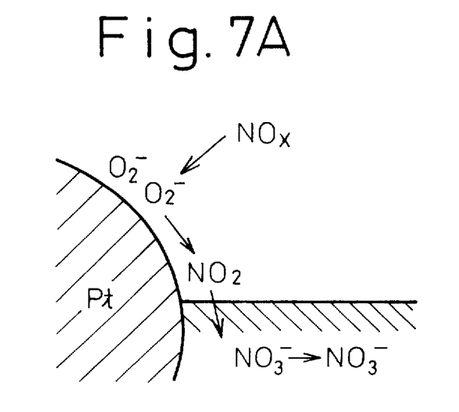
FIGS. 7A and 7B are views explaining the absorption and release action of the $NO_x$ absorbent.

When the mean value of the air-fuel ratio A/F in the combustion chamber 3 is maintained at the target air-fuel ratio $(A/F)_0$, that is, when it is maintained lean, the concentration of oxygen in the inflowing exhaust gas is high and therefore at this time as shown in FIG. 7A this oxygen $O_2$ adheres on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt and becomes $NO_2$ $(2NO+O_2 \rightarrow 2NO_2)$. Next, part of the $NO_2$ thus produced is absorbed in the absorbent while being oxidized on the platinum Pt and is dispersed in the absorbent in the form of nitrate ions $NO_3^-$ as shown in FIG. 7A while bonding with the barium oxide BaO. The $NO_x$ is absorbed in the $NO_x$ absorbent 17 in this way.

So long as the concentration of oxygen in the inflowing exhaust gas is high, $NO_2$ is produced on the surface of the platinum Pt, while so long as the ability of the absorbent to absorb $NO_x$ does not become saturated, $NO_x$ is absorbed in the $NO_x$ absorbent 17 and nitrate ions $NO_3^-$ are produced. As opposed to this, when the concentration of oxygen in the inflowing exhaust gas falls and the amount of production of $NO_2$ falls, the reaction proceeds in the reverse direction $(NO_3^- \rightarrow NO_2)$ and therefore the nitrate ions $NO_3^-$ in the absorbent are released from the absorbent in the form of $NO_2$. That is, when the concentration of oxygen in the inflowing exhaust gas falls, $NO_x$ is released from the $NO_x$ absorbent 17. If the degree of leanness of the inflowing exhaust gas becomes lower, the concentration of oxygen in the inflowing exhaust gas falls. Accordingly, by making the degree of leanness of the inflowing exhaust gas lower, even if the air-fuel ratio of the inflowing exhaust gas is lean, $NO_x$ is released from the $NO_x$ absorbent 17.

Figure 7B:
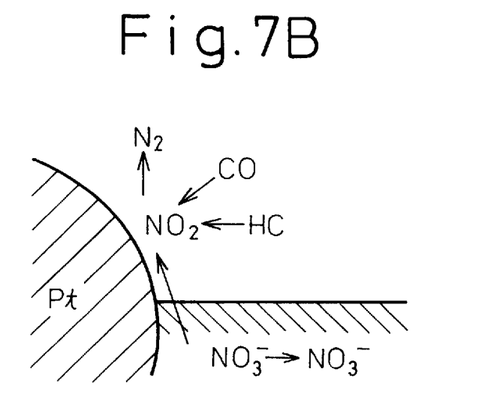

On the other hand, when the mean value of the air-fuel ratio A/F in the combustion chamber 3 is made rich and the air-fuel ratio of the inflowing exhaust gas becomes rich at this time, large amounts of unburnt hydrocarbons and carbon monoxide are exhausted from the engine. The unburnt hydrocarbons and carbon monoxide are oxidized by reaction with the oxygen $O_2^-$ or $O^{2-}$ on the platinum Pt. Further, when the air-fuel ratio of the inflowing exhaust gas becomes rich, the concentration of oxygen in the inflowing exhaust gas falls by a large amount, so $NO_2$ is released from the absorbent. This $NO_2$ is reduced by reaction with the unburnt hydrocarbons and carbon monoxide as shown in FIG. 7B. When there is no longer any $NO_2$ on the surface of the platinum Pt in this way, $NO_2$ is successively released from the absorbent. Accordingly, if the air-fuel ratio of the inflowing exhaust gas is made rich, the $NO_x$ is released from the $NO_x$ absorbent 17 in a short time.

That is, when making the air-fuel ratio of the inflowing exhaust gas rich, first the unburnt hydrocarbons and carbon monoxide are oxidized by immediate reaction with the $O_2^-$ and $O^{2-}$ on the platinum Pt, then if there is still unburnt hydrocarbons and carbon monoxide remaining even after the $O_2^-$ and $O^{2-}$ on the platinum Pt are consumed, the $NO_x$ released from the absorbent and the $NO_x$ exhausted from the engine are reduced by the unburnt hydrocarbons and carbon monoxide. Accordingly, if the air-fuel ratio of the inflowing exhaust gas is made rich, the $NO_x$ absorbed in the $NO_x$ absorbent 17 is released in a short time and further the released $NO_x$ is reduced, so it is possible to inhibit the exhaust of $NO_x$ into the atmosphere. Further, since the $NO_x$ absorbent 17 has the function of a reduction catalyst, the $NO_x$ released from the $NO_x$ absorbent 17 is reduced even when the air-fuel ratio of the inflowing exhaust gas is made the stoichiometric air-fuel ratio. However, where the air-fuel ratio of the inflowing exhaust gas is made the stoichiometric air-fuel ratio, the $NO_x$ is only gradually released from the $NO_x$ absorbent 17, so it takes a somewhat long time to release all of the $NO_x$ absorbed in the $NO_x$ absorbent 17.

As explained above, when the mean value of the air-fuel ratio A/F in the combustion chamber 3 is maintained lean, the $NO_x$ continues to be absorbed in the $NO_x$ absorbent 17. However, there are limits to the ability of the $NO_x$ absorbent 17 to absorb $NO_x$. If the ability of the $NO_x$ absorbent 17 to absorb $NO_x$ becomes saturated, the $NO_x$ absorbent 17 will no longer be able to absorb $NO_x$. Accordingly, before the ability of the $NO_x$ absorbent 17 to absorb $NO_x$ becomes saturated, it is necessary to release the $NO_x$ from the $NO_x$ absorbent 17. Therefore, it is necessary to estimate to what extent $NO_x$ is absorbed in the $NO_x$ absorbent 17. Next, a simple explanation will be made of the method of estimating the amount of absorption of $NO_x$.

Figure 8:
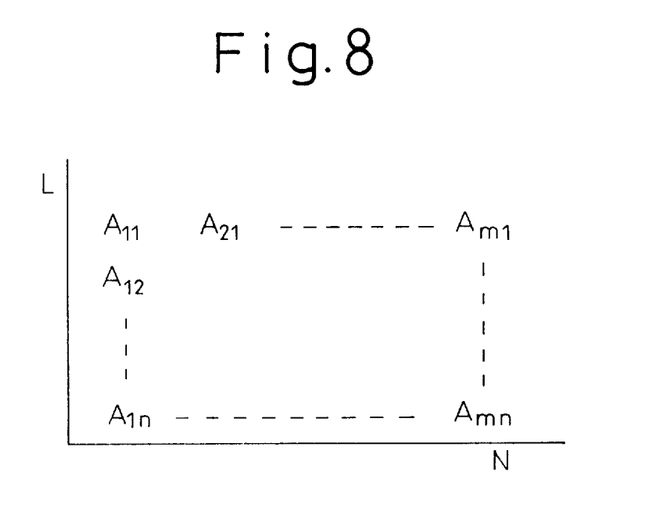
FIG. 8 is a view of a map of the $NO_x$ absorption amount A.

When the mean value of the air-fuel ratio A/F in the combustion chamber 3 is maintained lean, the higher the engine load, the greater the amount of $NO_x$ which is exhausted from the engine per unit time, so the greater the amount of $NO_x$ which is absorbed in the $NO_x$ absorbent per unit time. Further, the higher the engine rotational speed, the greater the amount of $NO_x$ which is exhuasted from the engine per unit time and therefore the greater the amount of $NO_x$ which is absorbed in the $NO_x$ absorbent 17 per unit time. Therefore, the amount of $NO_x$ which is absorbed in the $NO_x$ absorbent 17 is a function of the engine load and the engine speed. Accordingly, in this embodiment of the present invention, the amount of $NO_x$ absorbed in the $NO_x$ absorbent 17 per unit time is found in advance by experiments as a function of the amount of depression L of the accelerator pedal 23 and the engine speed N and this $NO_x$ amount A is stored in advance in the ROM 32 as a function of L and N in the form of the map shown in FIG. 8. In this way, since the amount of absorption of $NO_x$ per unit time is shown by A, the $NO_x$ amount $\Sigma NO_x$ estimated to be absorbed in the $NO_x$ absorbent 17 may be expressed by the following formula.

$$\Sigma NO_x = \Sigma NO_x + A$$

In this embodiment of the present invention, when the estimated absorbed $NO_x$ amount $\Sigma NO_x$ exceeds the predetermined upper limit MAX, the mean value of the air-fuel ratio A/F in the combustion chamber 3 is temporarily made rich in a spike-like manner, whereby the $NO_x$ is made to be released from the $NO_x$ absorbent 17. Of course, at this time, it is also possible to make the mean value of the air-fuel ratio A/F in the combustion chamber 3 the stoichiometric air-fuel ratio, but in this case, it takes a long time to release all of the $NO_x$ from the $NO_x$ absorbent 17.

In this way, in this embodiment of the present invention, the mean value of the air-fuel ratio A/F in the combustion chamber 3 is made rich when the $NO_x$ should be released from the $NO_x$ absorbent 17. However, in the present invention, since oxygen is contained in the fuel, oxygen is homogeneously dispersed in the fuel spray and accordingly the fuel particles are burned in the presence of a large amount of oxygen, so only a small amount of soot is produced. That is, by using fuel containing oxygen in this way, it becomes possible for the first time to make the mean value of the air-fuel ratio in the combustion chamber 3 rich. Accordingly, in the present invention, it is also possible to use fuel containing oxygen as the fuel only when the $NO_x$ should be released from the $NO_x$ absorbent 17.

However, when just the fuel injection amount is controlled to make the mean value of the air-fuel ratio in the combustion chamber 3 rich, that is, when the mean value of the air-fuel ratio is made rich by increasing the fuel injection amount, a shock occurs. Accordingly, it is preferable to make the mean value of the air-fuel ratio rich without changing the fuel injection amount as much as possible. Therefore, in the first embodiment of the present invention, the opening of the EGR control valve 20 is made larger so as to increase the amount of the EGR gas and reduce the amount of intake air supplied in the combustion chamber 3 so as to make the mean value of the air-fuel ratio A/F rich. Further, in the second embodiment of the present invention, the opening of the throttle valve 14 is made smaller so as to reduce the amount of intake air supplied in the combustion chamber 3 and thereby make the mean value of the air-fuel ratio A/F rich.

Figure 9:
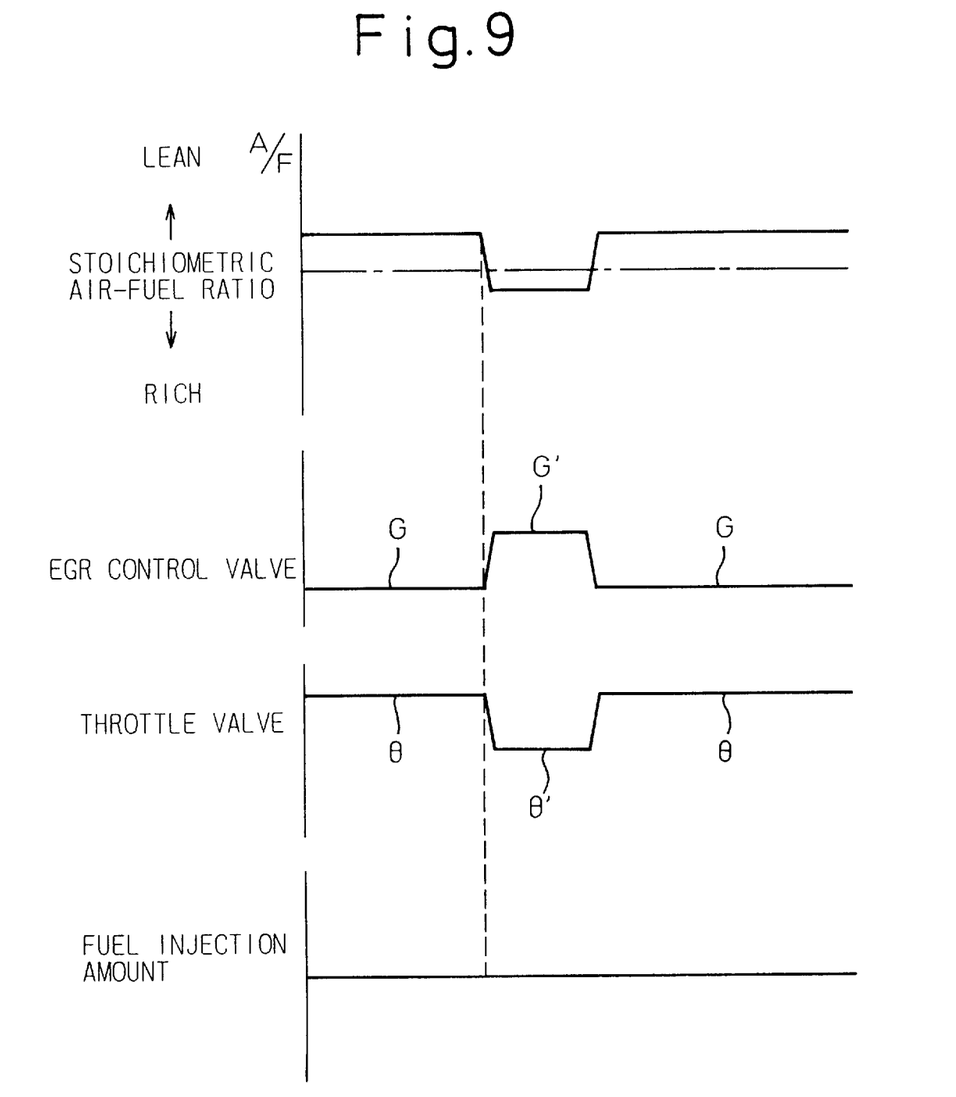
FIG. 9 is a time chart of a first embodiment of the $NO_x$ releasing control.

On the other hand, in a third embodiment of the present invention, the opening of the EGR control valve 20 is made larger and the opening of the throttle valve 14 is simultaneously made smaller so as to make the mean value of the air-fuel ratio A/F rich. The broken lines in FIG. 4 show the opening G' of the EGR control valve 20 and the opening θ' of the throttle valve 14 when making the mean value of the air-fuel ratio A/F rich by simultaneous control of the EGR control valve 20 and the throttle valve 14. FIG. 9 shows the changes in the mean value of the air-fuel ratio A/F etc. at this time.

Figure 10:
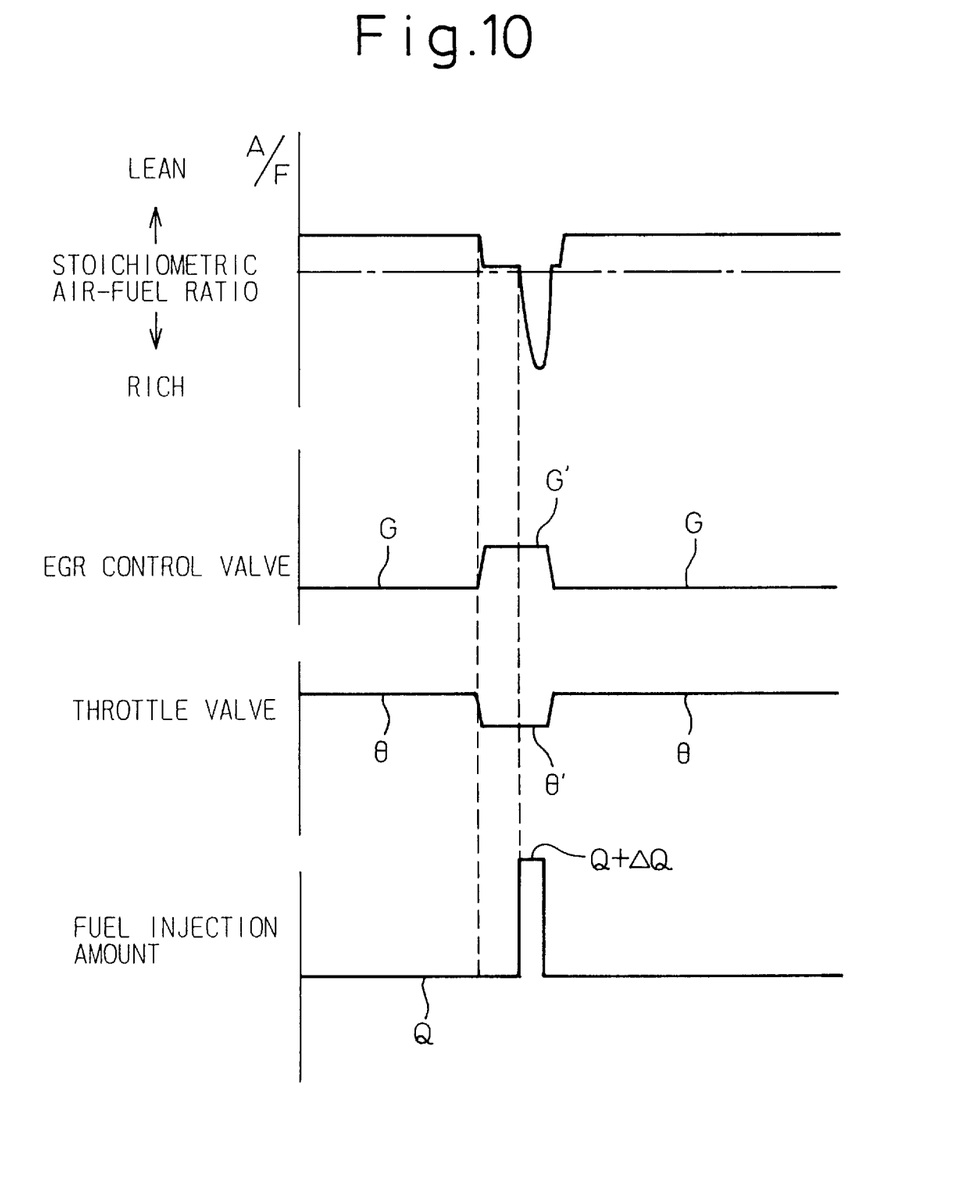
FIG. 10 is a time chart of a second embodiment of the $NO_x$ releasing control.

In a fourth embodiment of the present invention, the opening of the EGR control valve 20 is made larger and the opening of the throttle valve 14 is made smaller to increase the fuel injection amount so as to make the mean value of the air-fuel ratio A/F rich. FIG. 10 shows the change in the mean value of the air-fuel ratio A/F etc. at this time.

In a fifth embodiment according to the present invention, the mean value of the air-fuel ratio A/F is made rich by increasing the fuel injection amount. However, in this case, there is the problem of the occurrence of shock as mentioned earlier.

Figure 11:
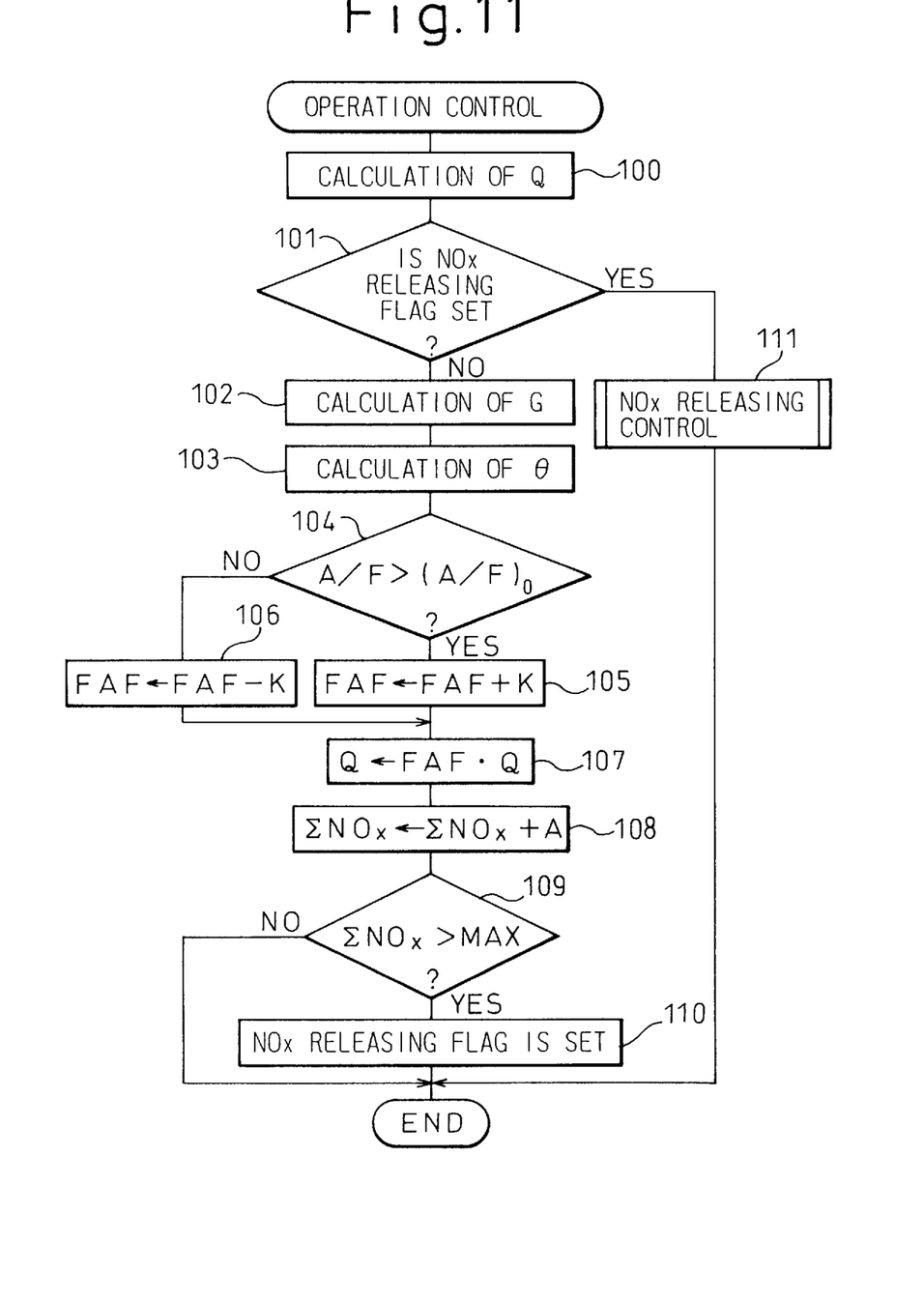
FIG. 11 is a flow chart of the operating control.

FIG. 11 shows the operation control routine for controlling the fuel injection amount Q when the mean value of the air-fuel ratio A/F in the combustion chamber 3 is maintained lean so as to control by feedback the mean value of the air-fuel ratio A/F to the target air-fuel ratio $(A/F)_0$. This routine is executed by interruption at every fixed time interval, for example.

Figure 2B:
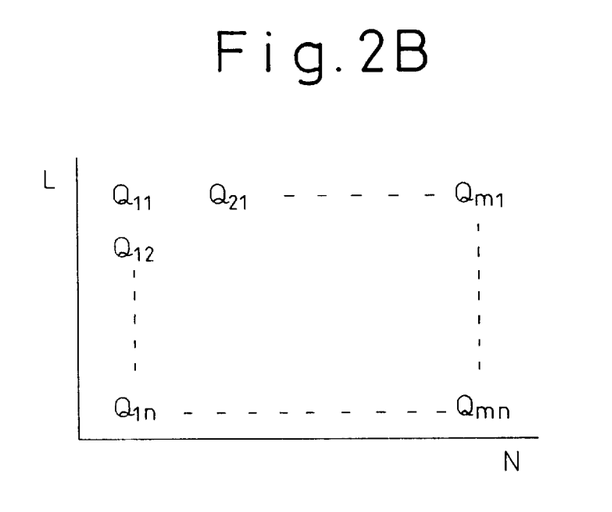

Referring to FIG. 11, first, at step 100, the fuel injection amount Q is calculated from the map shown in FIG. 2B. Next, at step 101, whether the $NO_x$ releasing flag, which is set when $NO_x$ should be released from the $NO_x$ absorbent 17, is set or not is decided. When the $NO_x$ releasing flag is not set, the routine proceeds to step 102, where the opening G of the EGR control valve 20 is calculated from the map shown in FIG. 5A, then at step 103 the opening θ of the throttle valve 14 is calculated from the map shown in FIG. 5B.

Next, at step 104, whether the mean value of the air-fuel ratio A/F in the combustion chamber 3 detected by the air-fuel ratio sensor 22 is larger than the target air-fuel ratio $(A/F)_0$ or not is decided. When $A/F > (A/F)_0$, the routine proceeds to step 105, where the constant value K is added to the feedback correction coefficient FAF, then the routine proceeds to step 107. As opposed to this, when $A/F \leq (A/F)_0$, the routine proceeds to step 106, where the constant value K is subtracted from the feedback correction coefficient FAF, then the routine proceeds to step 107. At step 107, the feedback correction coefficient FAF is multiplied with the fuel injection amount Q to calculate the final fuel injection amount Q ($=FAF \cdot Q$). That is, when $A/F > (A/F)_0$, the fuel injection amount Q is increased, while when $A/F \leq (A/F)_0$, the fuel injection amount Q is reduced, whereby the mean value of the air-fuel ratio A/F is maintained at the target air-fuel ratio $(A/F)_0$. Note that FAF is moved up and down about the level 1.0.

Next, at step 108, the $NO_x$ absorption amount A shown in the map of FIG. 8 is added to the estimated absorbed $NO_x$ amount $\Sigma NO_x$, then at step 109, whether the estimated absorbed $NO_x$ amount $\Sigma NO_x$ has exceeded the upper limit MAX or not is decided. When $\Sigma NO_x \leq MAX$, the processing cycle is completed. As opposed to this, when $\Sigma NO_x > MAX$, the routine proceeds to step 110, where the $NO_x$ releasing flag is set. When the $NO_x$ releasing flag is set, at the next processing cycle, the routine proceeds from step 101 to step 111, where the control of the release of $NO_x$ from the $NO_x$ absorbent 17 is performed.

Figure 12:
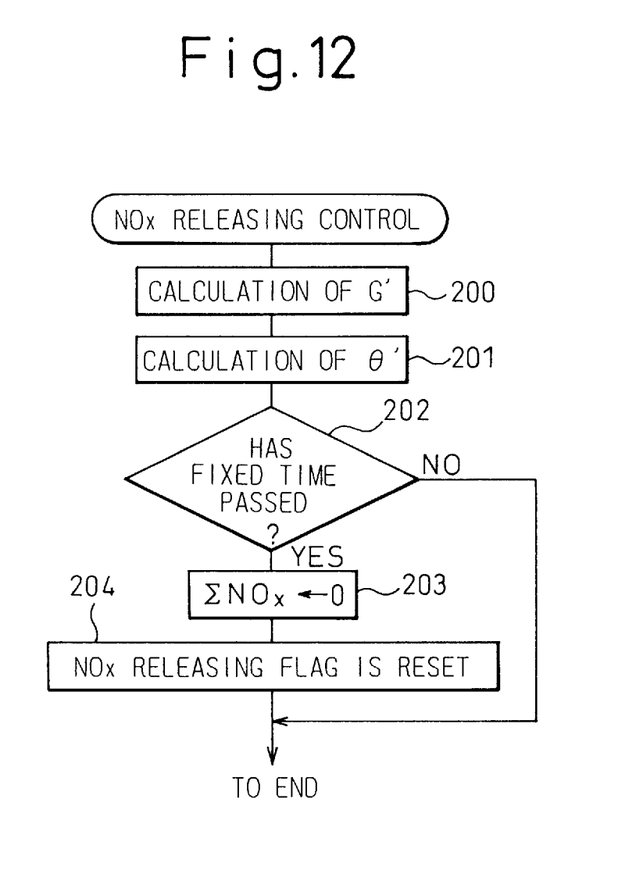
FIG. 12 is a flow chart of the $NO_x$ releasing control.

FIG. 12 shows a first embodiment of the control for the release of $NO_x$ performed at step 111 in FIG. 11. In this first embodiment, the control shown in FIG. 9 is performed.

That is, referring to FIG. 12, first, at step 200, the opening G' of the EGR control valve 20 shown in FIG. 4 is calculated and the EGR control valve 20 is opened to this opening G'. Next, at step 201, the opening θ' of the throttle valve 14 shown in FIG. 5 is calculated and the throttle valve 14 is closed to this degree θ'. Next, at step 202, whether the fixed time necessary for releasing all of the $NO_x$ from the $NO_x$ absorbent 17 has elapsed or not is decided. When the fixed time has elapsed, that is, when all of the $NO_x$ has been released from the $NO_x$ absorbent 17, the routine proceeds to step 203, where the estimated absorption amount $\Sigma NO_x$ is made zero, then the routine proceeds to step 204, where the $NO_x$ releasing flag is reset. When the $NO_x$ releasing flag is reset, at the next processing cycle, the EGR control valve 20 is closed to the opening G and the throttle valve 14 is opened to the degree θ.

Figure 13:
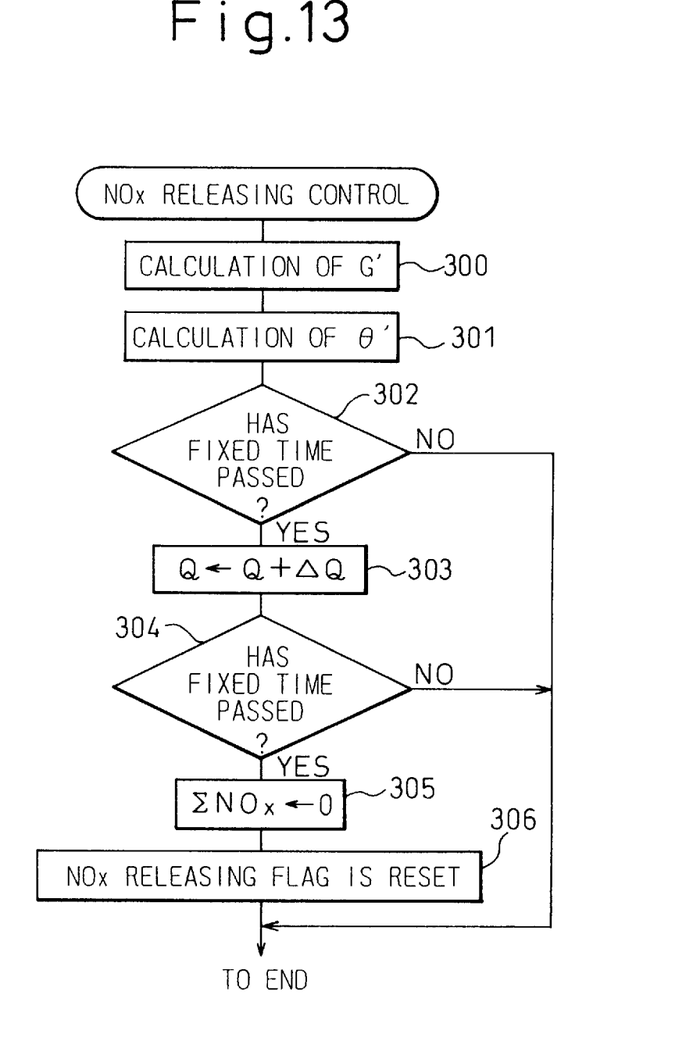
FIG. 13 is a flow chart of another embodiment of the $NO_x$ releasing control.

FIG. 13 shows a second embodiment of the control for release of $NO_x$ performed at step 111 in FIG. 11. In this second embodiment, the control shown in FIG. 10 is performed.

That is, referring to FIG. 13, first, at step 300, the opening G' of the EGR control valve 20 shown in FIG. 4 is calculated and the EGR control valve 20 is opened to this degree G'. Next, at step 301, the opening θ' of the throttle valve 14 shown in FIG. 4 is calculated and the throttle valve 14 is closed to this degree θ'. Next, at step 302, whether a fixed time has elapsed from when the operation for opening the EGR control valve 20 and the operation for closing the throttle valve 14 were started or not is decided. When the fixed time has elapsed, the routine proceeds to step 303.

At step 303, the fuel injection amount Q is increased by exactly ΔQ, whereby the mean value of the air-fuel ratio A/F is made rich. Next, at step 304, whether the fixed time required for releasing all of the $NO_x$ from the $NO_x$ absorbent 17 has elapsed or not is decided. When the fixed time has elapsed, that is, when all of the $NO_x$ has been released from the $NO_x$ absorbent 17, the routine proceeds to step 305, where the estimated absorption amount $\Sigma NO_x$ is made zero, then the routine proceeds to step 306, where the $NO_x$ releasing flag is reset. When the $NO_x$ releasing flag is reset, at the next processing cycle, the EGR control valve 20 is closed to the degree G and the throttle valve 14 is opened to the degree θ.

Figure 14:
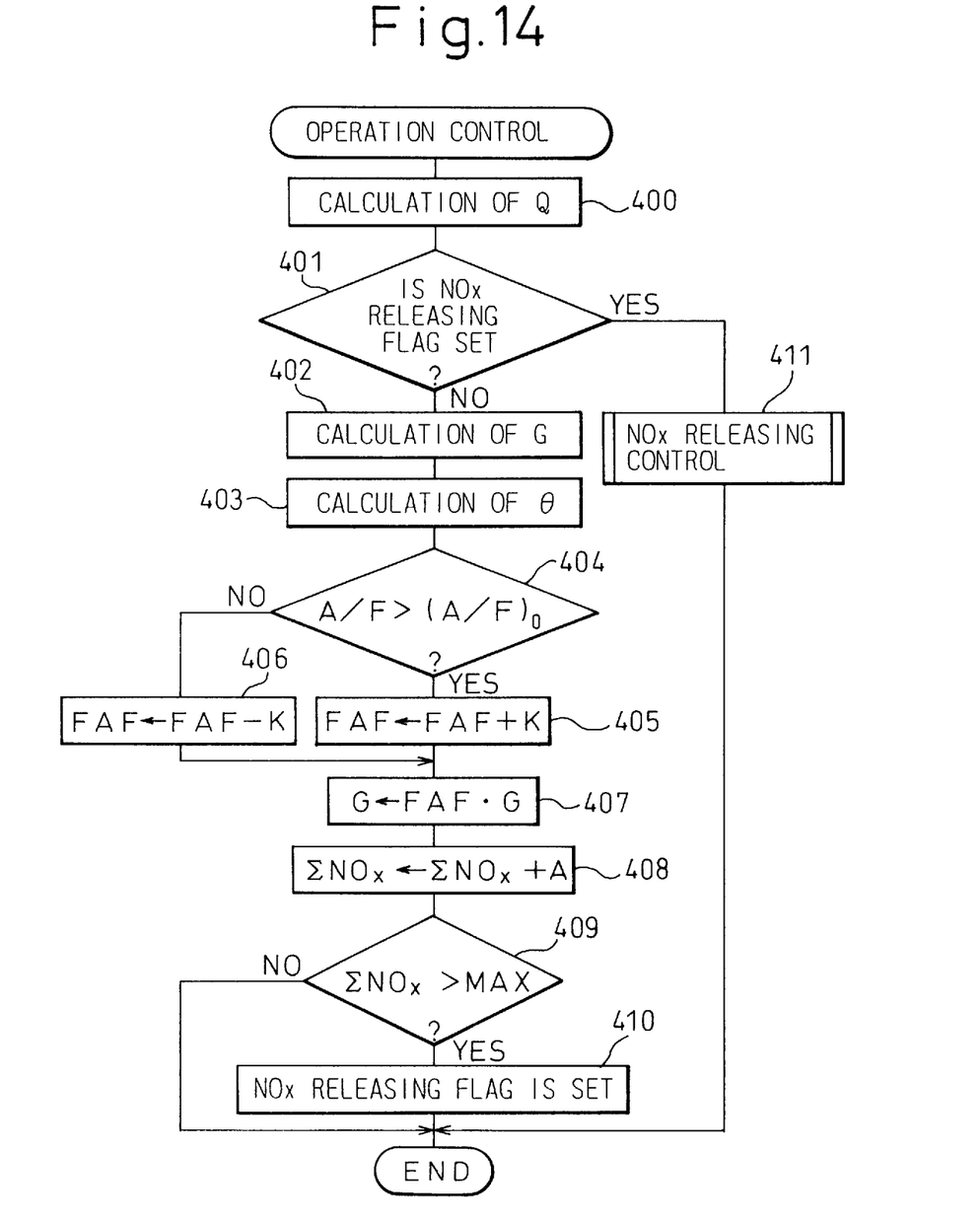
FIG. 14 is a flow chart of another embodiment of the operating control.

FIG. 14 shows the operation control routine for controlling the amount of EGR gas when the mean value of the air-fuel ratio A/F in the combustion chamber 3 is maintained lean so as to control by feedback the mean value of the air-fuel ratio A/F to the target air-fuel ratio $(A/F)_0$. This routine is executed by interruption at every fixed time interval, for example.

Referring to FIG. 14, first, at step 400, the fuel injection amount Q is calculated from the map shown in FIG. 2B. Next, at step 401, whether the $NO_x$ releasing flag, which is set when $NO_x$ should be released from the $NO_x$ absorbent 17, is set or not is decided. When the $NO_x$ releasing flag is not set, the routine proceeds to step 402, where the opening G of the EGR control valve 20 is calculated from the map shown in FIG. 5A, then at step 403 the opening θ of the throttle valve 14 is calculated from the map shown in FIG. 5B.

Next, at step 404, whether the mean value of the air-fuel ratio A/F in the combustion chamber 3 detected by the air-fuel ratio sensor 22 is larger than the target air-fuel ratio $(A/F)_0$ or not is decided. When $A/F > (A/F)_0$, the routine proceeds to step 405, where the constant value K is added to the feedback correction coefficient FAF, then the routine proceeds to step 407. As opposed to this, when $A/F \leq (A/F)_0$, the routine proceeds to step 406, where the constant value K is subtracted from the feedback correction coefficient FAF, then the routine proceeds to step 407. At step 407, the feedback correction coefficient FAF is multiplied with the opening G of the EGR control valve 20 so as to calculate the final EGR control valve opening G (=FAF·G). That is, when $A/F > (A/F)_0$, the amount of EGR gas is increased, while when $A/F \leq (A/F)_0$, the amount of the EGR gas is reduced, thereby maintaining the mean value of the air-fuel ratio A/F at the target air-fuel ratio $(A/F)_0$.

Next, at step 408, the $NO_x$ absorption amount A shown by the map of FIG. 8 is added to the $NO_x$ amount $\Sigma NO_x$, then at step 409, whether the estimated absorbed $NO_x$ amount $\Sigma NO_x$ exceeds the upper limit MAX or not is decided. When $\Sigma NO_x \leq MAX$, the processing cycle is ended. As opposed to this, when $\Sigma NO_x > MAX$, the routine proceeds to step 410, where the $NO_x$ releasing flag is set. When the $NO_x$ releasing flag is set, the routine proceeds from step 401 to step 411 in the next processing cycle, where the release of $NO_x$ from the $NO_x$ absorbent 17 is controlled. At step 411, the $NO_x$ releasing control routine shown in FIG. 12 or the $NO_x$ releasing control routine should in FIG. 13 is executed.

As explained above, according to the present invention, it is possible to make the mean value of the air-fuel ratio in the combustion chamber the stoichiometric air-fuel ratio or rich while inhibiting the production of a large amount of soot when causing the release of $NO_x$ from an $NO_x$ absorbent provided in the engine exhaust passage of a compression ignition type engine.

While the invention has been described by reference to specific embodiments chose for purposes of illustration, it should be apparent that numerous modifications could be made thereto by those skilled in the art without departing from the basic concept and scope of the invention.

We claim:

1. A compression ignition type engine having an exhaust passage, comprising:

an $NO_x$ absorbent arranged in the exhaust passage, said $NO_x$ absorbent absorbing $NO_x$ when an air-fuel ratio of exhaust gas flowing into said $NO_x$ absorbent is lean and releasing the absorbed $NO_x$ when said air-fuel ratio of exhaust gas is one of a rich air-fuel ratio and the stoichiometric air-fuel ratio; and air-fuel ratio control means for normally maintaining the mean value of the air-fuel ratio in a combustion chamber of the engine at a lean air-fuel ratio and changing over said mean value of the air-fuel ratio from a lean air-fuel ratio to one of a rich air-fuel ratio and the stoichiometric air-fuel ratio when $NO_x$ should be released from said $NO_x$ absorbent, a fuel containing oxygen therein being used at least when said mean value of air-fuel ratio is made one of a rich air-fuel ratio and the stoichiometric air-fuel ratio.

2. A compression ignition type engine according to claim 1, wherein the fuel containing oxygen is used also when the mean value of the air-fuel ratio is lean.

3. A compression ignition type engine according to claim 1, wherein exhaust gas recirculation control means is provided for controlling an amount of exhaust gas recirculated from the exhaust passage to an intake passage of the engine to increase said amount of exhaust gas when said mean value of the air-fuel ratio is changed over from a lean air-fuel ratio to one of a rich air-fuel ratio and the stoichiometric air-fuel ratio.

4. A compression ignition type engine according to claim 1, wherein a throttle valve is provided in the intake passage of the engine and when the mean value of the air-fuel ratio is changed from lean to one of the stoichiometric air-fuel ratio and rich, the opening of the throttle valve is made smaller.

5. A compression ignition type engine according to claim 1, wherein when the mean value of the air-fuel ratio is changed from lean to one of the stoichiometric air-fuel ratio and rich, the fuel injection amount is increased.

6. A compression ignition type engine according to claim 1, wherein when releasing $NO_x$ from the $NO_x$ absorbent, the mean value of the air-fuel ratio is made rich in a spike manner.

7. A compression ignition type engine according to claim 1, wherein exhaust gas recirculation control means is provided for controlling an amount of exhaust gas recirculated from the exhaust passage to an intake passage of the engine to increase said amount of exhaust gas as an engine load becomes low.

8. A compression ignition type engine according to claim 7, wherein a throttle valve is provided in the intake passage of the engine and the opening of the throttle valve is made smaller the lower the engine load.

9. A compression ignition type engine according to claim 1, further provided with an air-fuel ratio sensor arranged in the exhaust passage and air-fuel ratio feedback control means for controlling by feedback the mean value of the air-fuel ratio to the target air-fuel ratio based on an output signal of the air-fuel ratio sensor.

10. A compression ignition type engine according to claim 9, wherein said air-fuel ratio feedback control means controls the mean value of the air-fuel ratio to the target lean air-fuel ratio by controlling the fuel injection amount.

11. A compression ignition type engine according to claim 9, where exhaust gas recirculation control means is provided for controlling the amount of the exhaust gas recirculated from the exhaust passage to the intake passage of the engine and where the air-fuel ratio feedback control means controls the mean value of the air-fuel ratio to the target lean air-fuel ratio by controlling the amount of recirculated exhaust gas.

12. A compression ignition type engine according to claim 9, wherein the target air-fuel ratio becomes closer to the stoichiometric air-fuel ratio the higher the engine load.

13. A compression ignition type engine according to claim 1, wherein the fuel containing oxygen is comprised of fuel containing oxygen in the molecules of the hydrocarbons themselves.

14. A compression ignition type engine according to claim 1, wherein the fuel containing oxygen is comprised of fuel obtained by adding an additive containing oxygen.

* * * * *